A. S. COLVER AND H. E. BELLM.
LABELING MACHINE.
APPLICATION FILED NOV. 6, 1916.
1,353,519.
Patented Sept. 21, 1920.
14 SHEETS—SHEET 1.
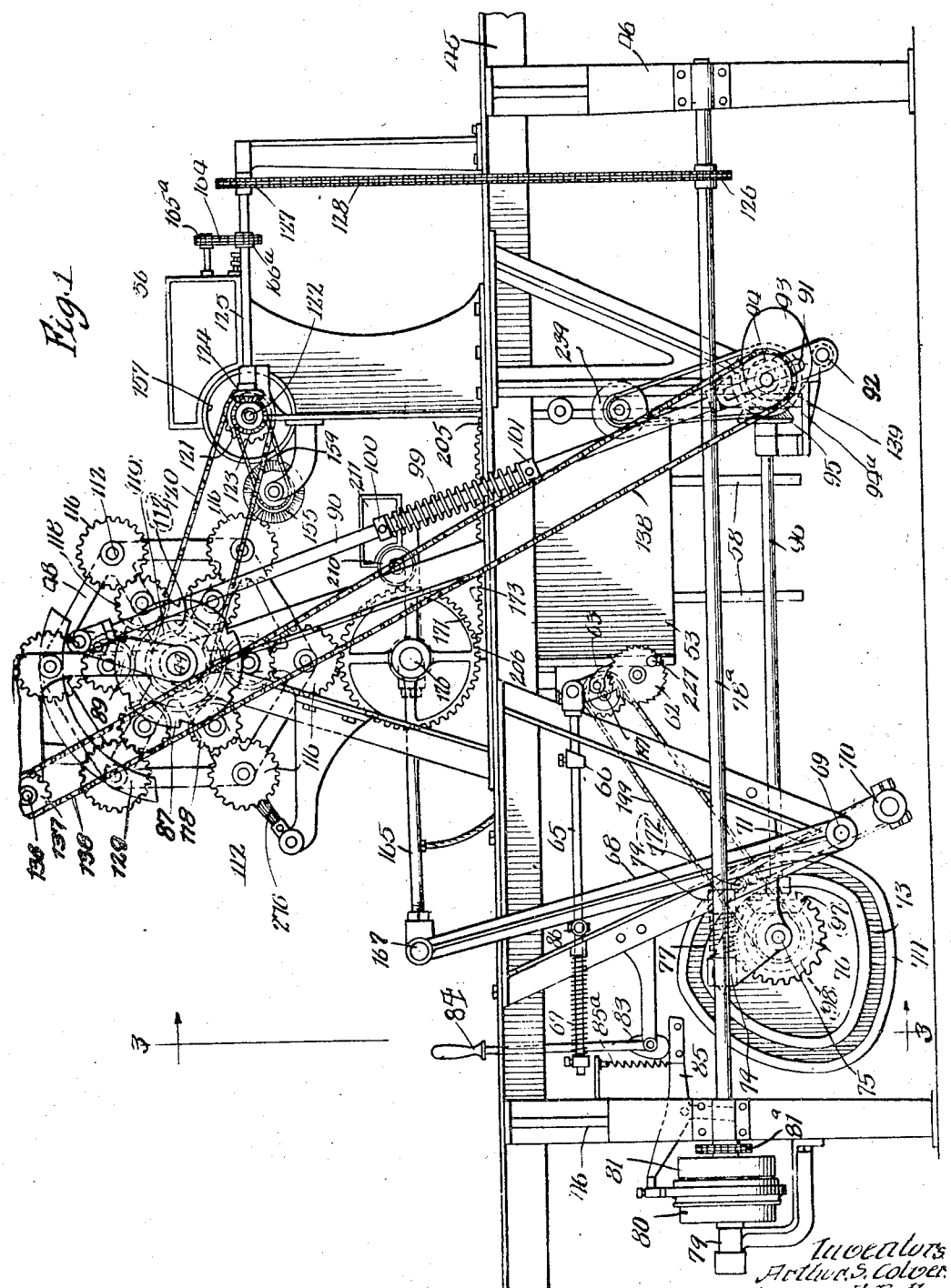

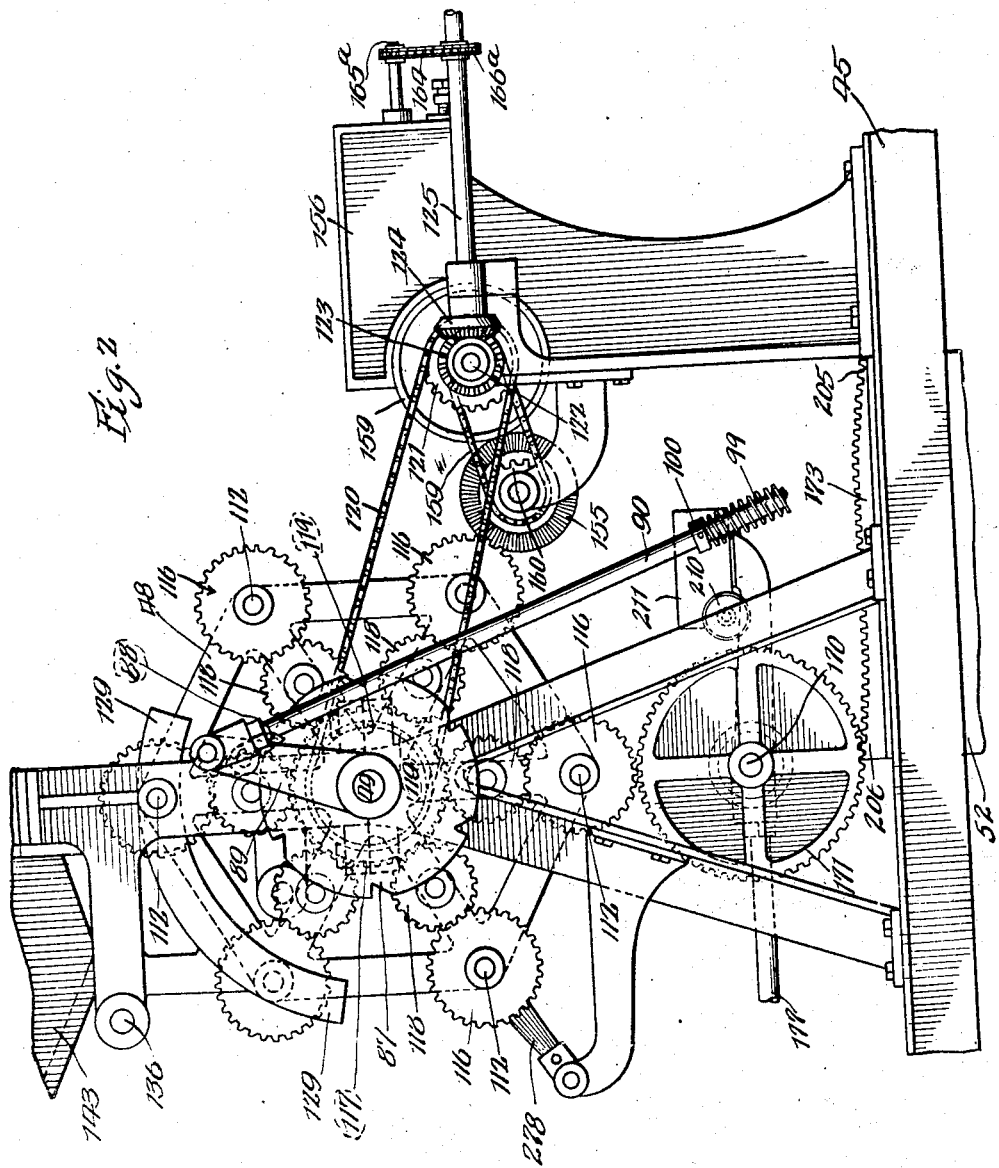

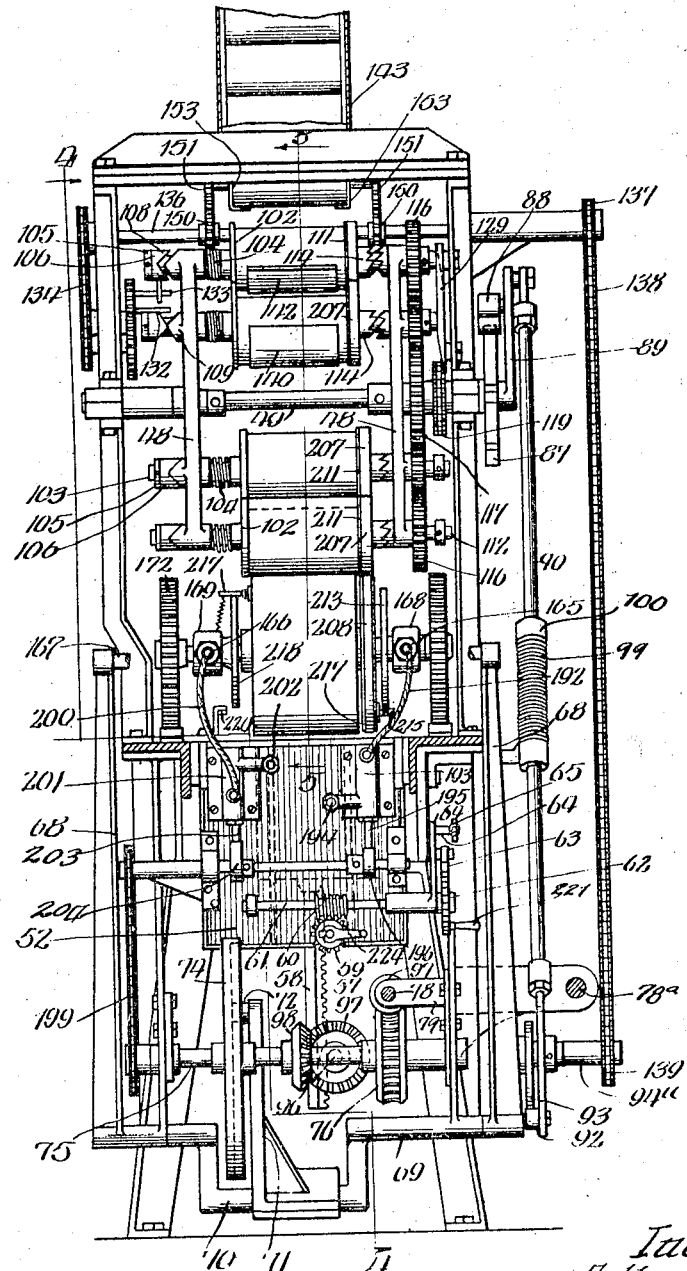

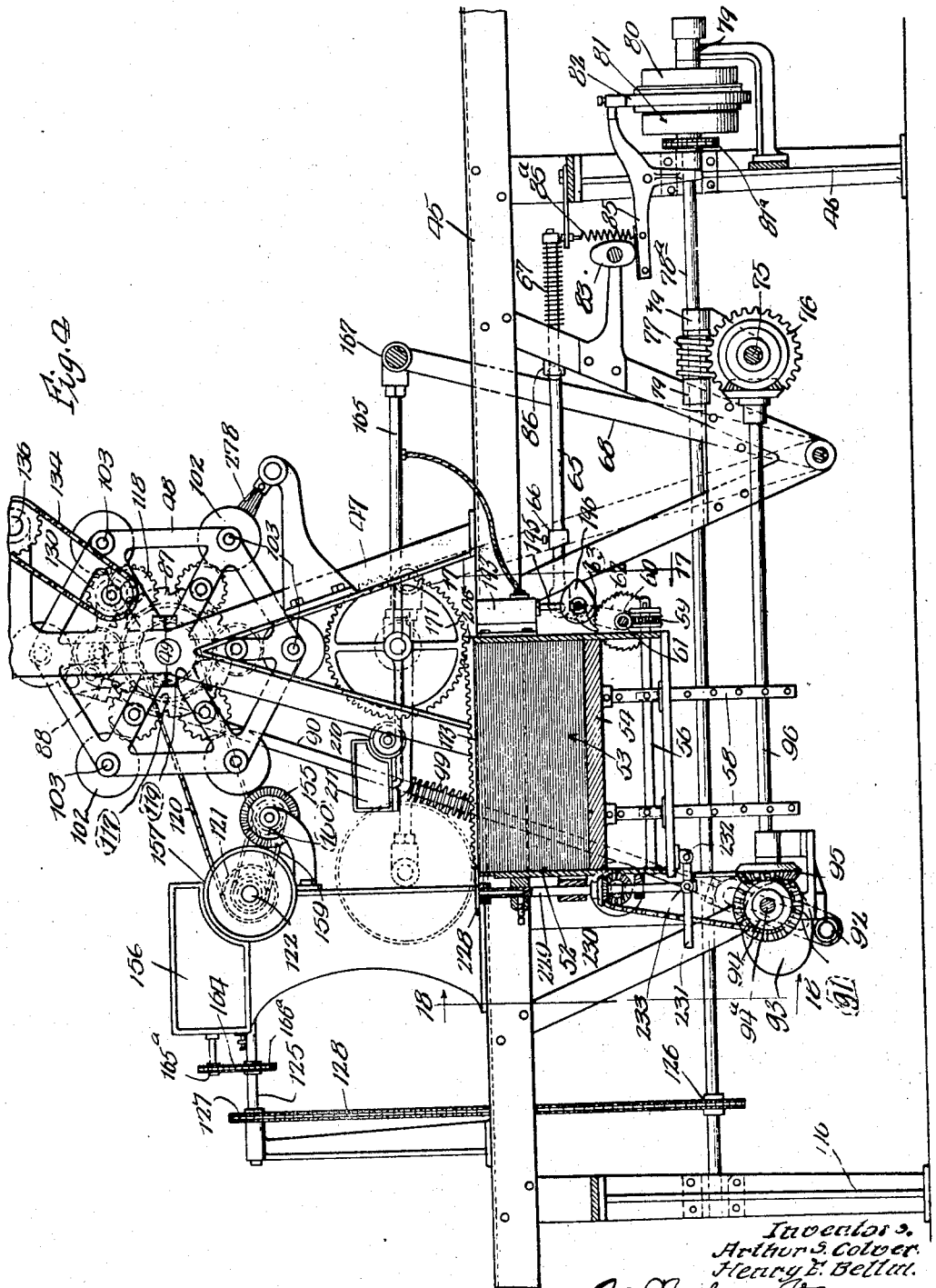

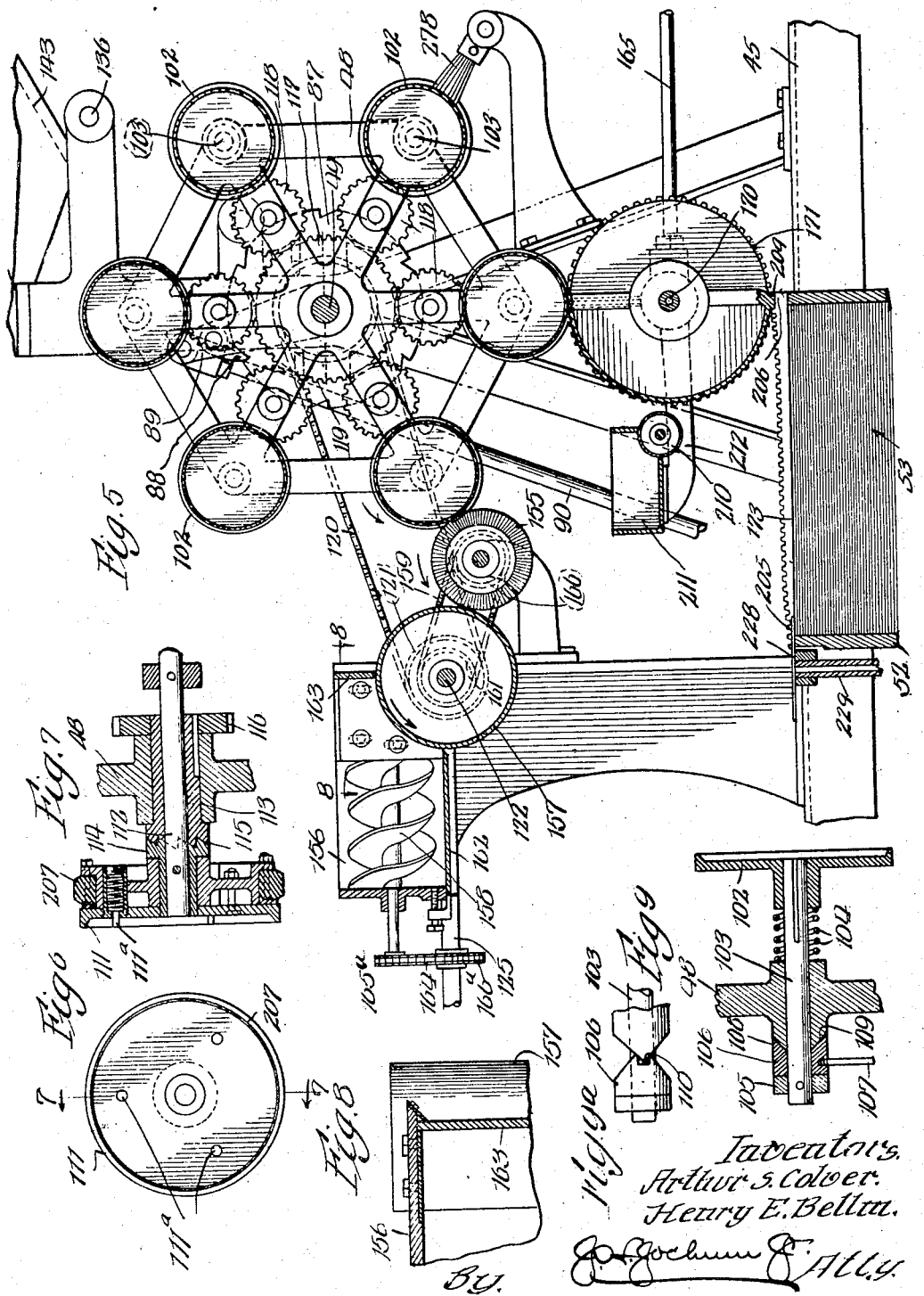

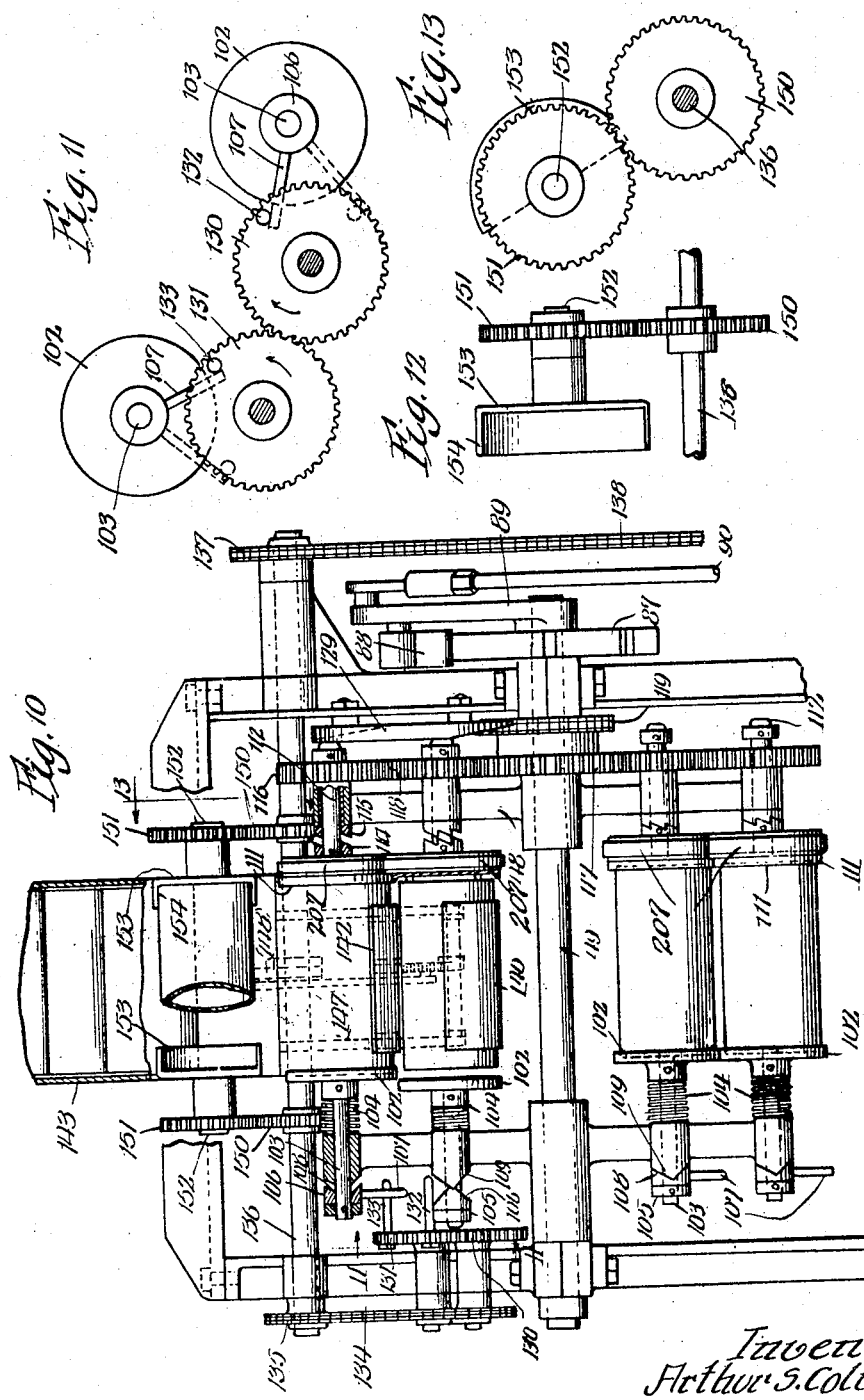

A. S. COLVER AND H. E. BELLM.
LABELING MACHINE.
APPLICATION FILED NOV. 6, 1916.
1,353,519. Patented Sept. 21, 1920.
14 SHEETS—SHEET 7.
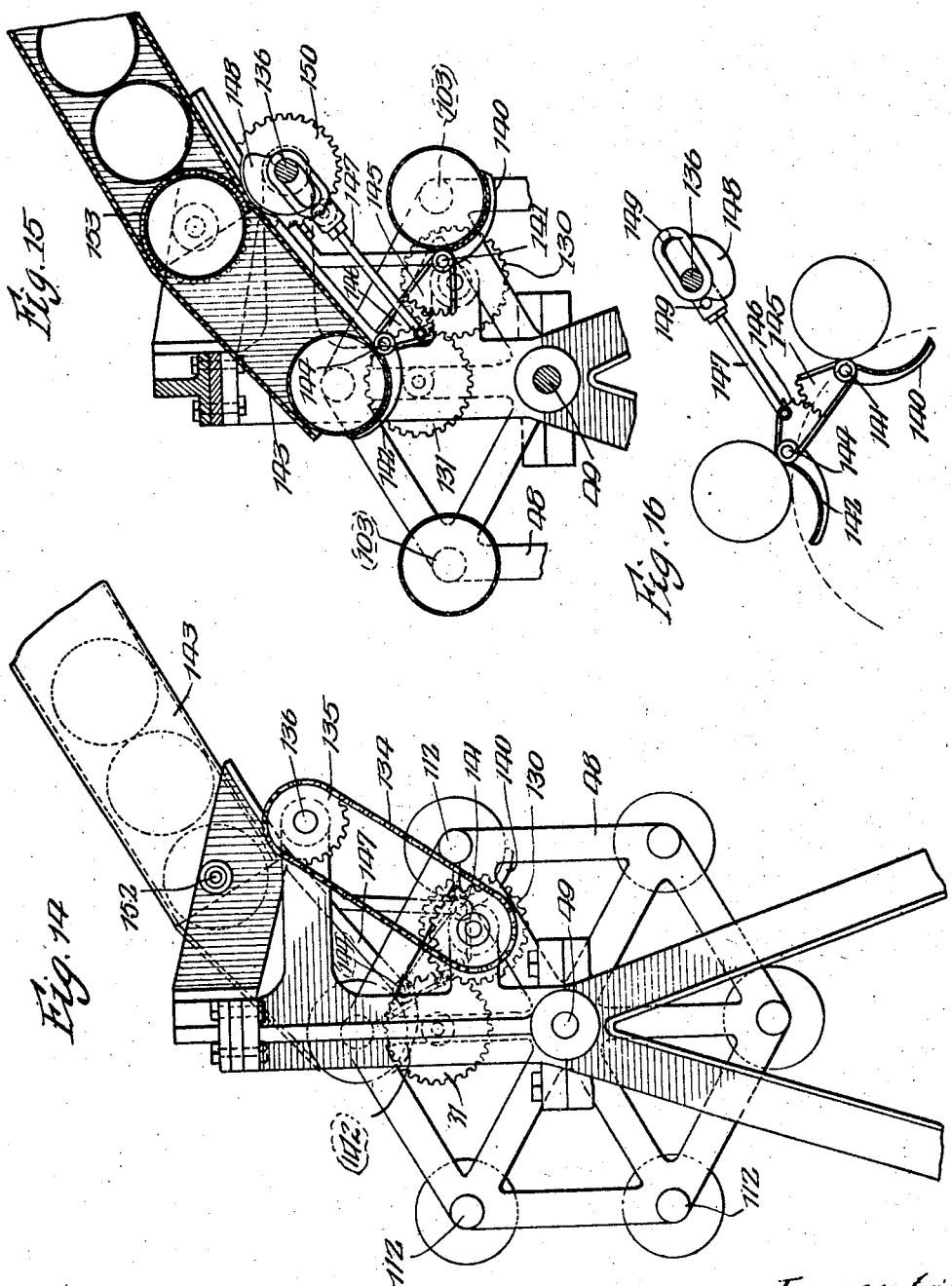

A. S. COLVER AND H. E. BELLM.
LABELING MACHINE.
APPLICATION FILED NOV. 6, 1916.
1,353,519.
Patented Sept. 21, 1920.
14 SHEETS—SHEET 8.
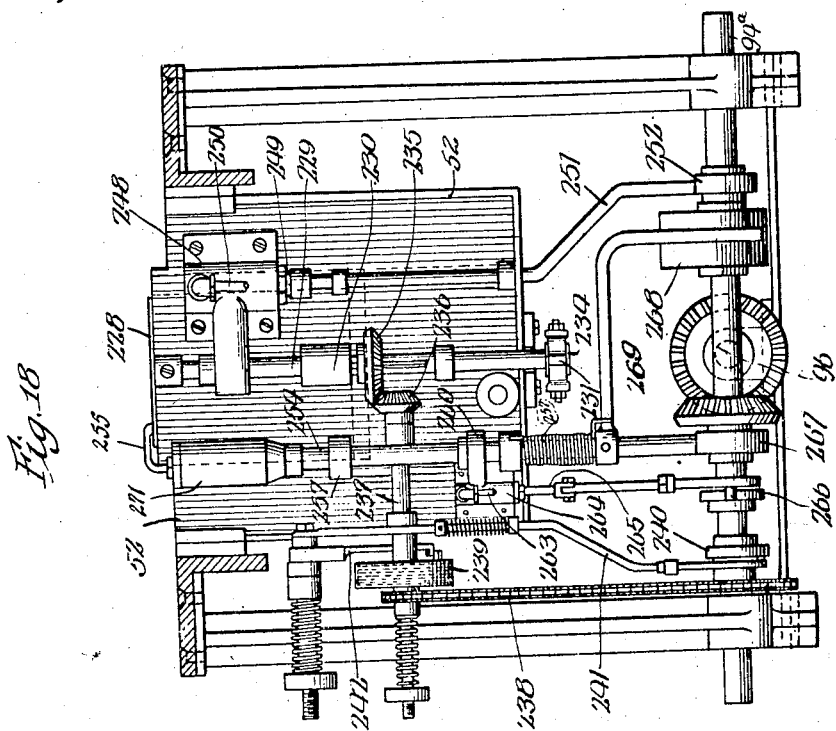
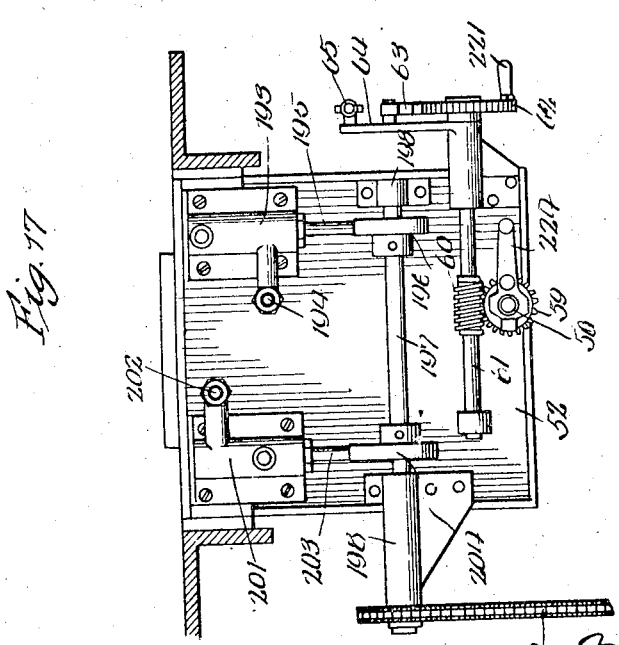

A. S. COLVER AND H. E. BELLM.
LABELING MACHINE.
APPLICATION FILED NOV. 6, 1916.
1,353,519.
Patented Sept. 21, 1920.
14 SHEETS—SHEET 9.
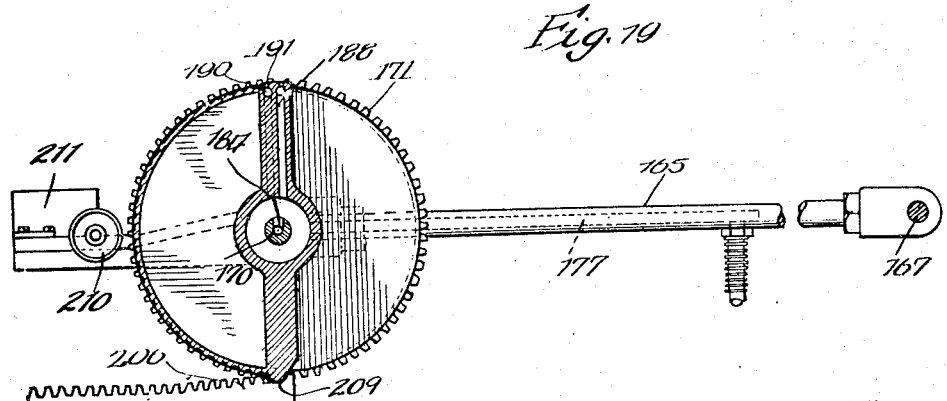
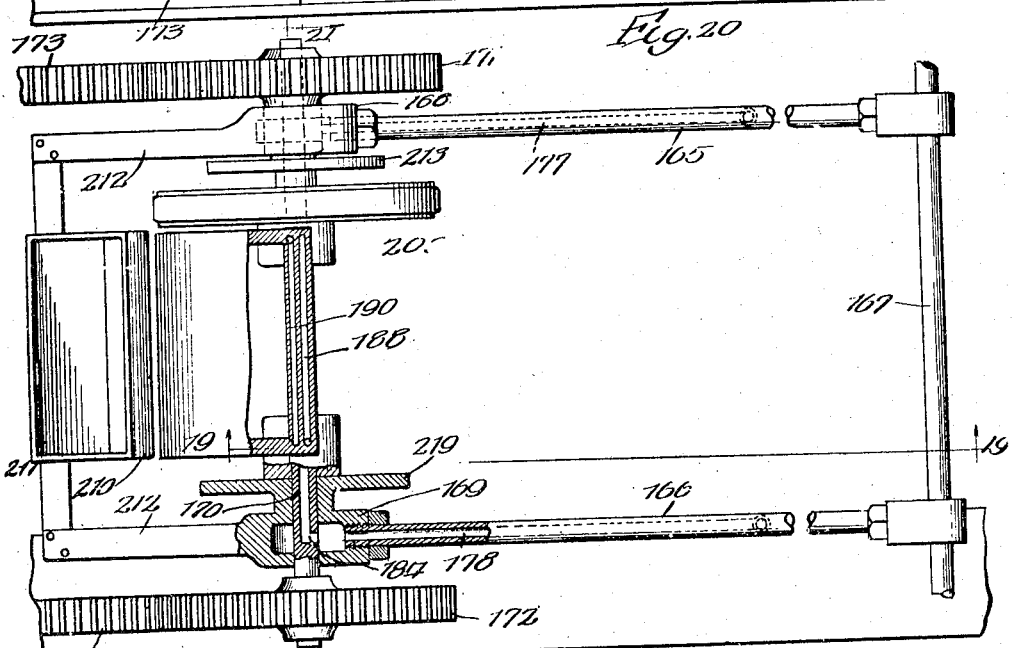
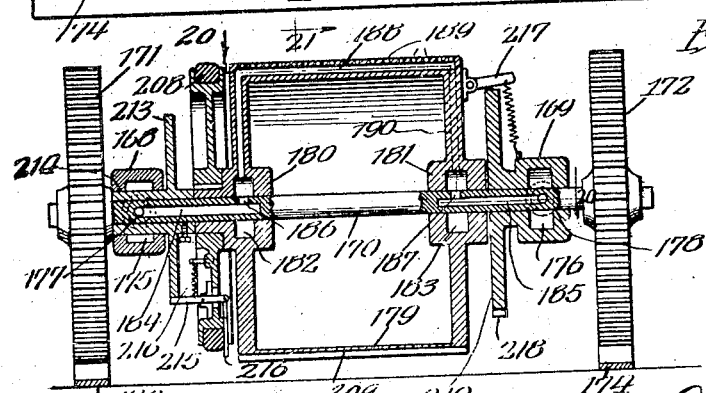
Inventors
Arthur S. Colver.
Henry E. Bellm.

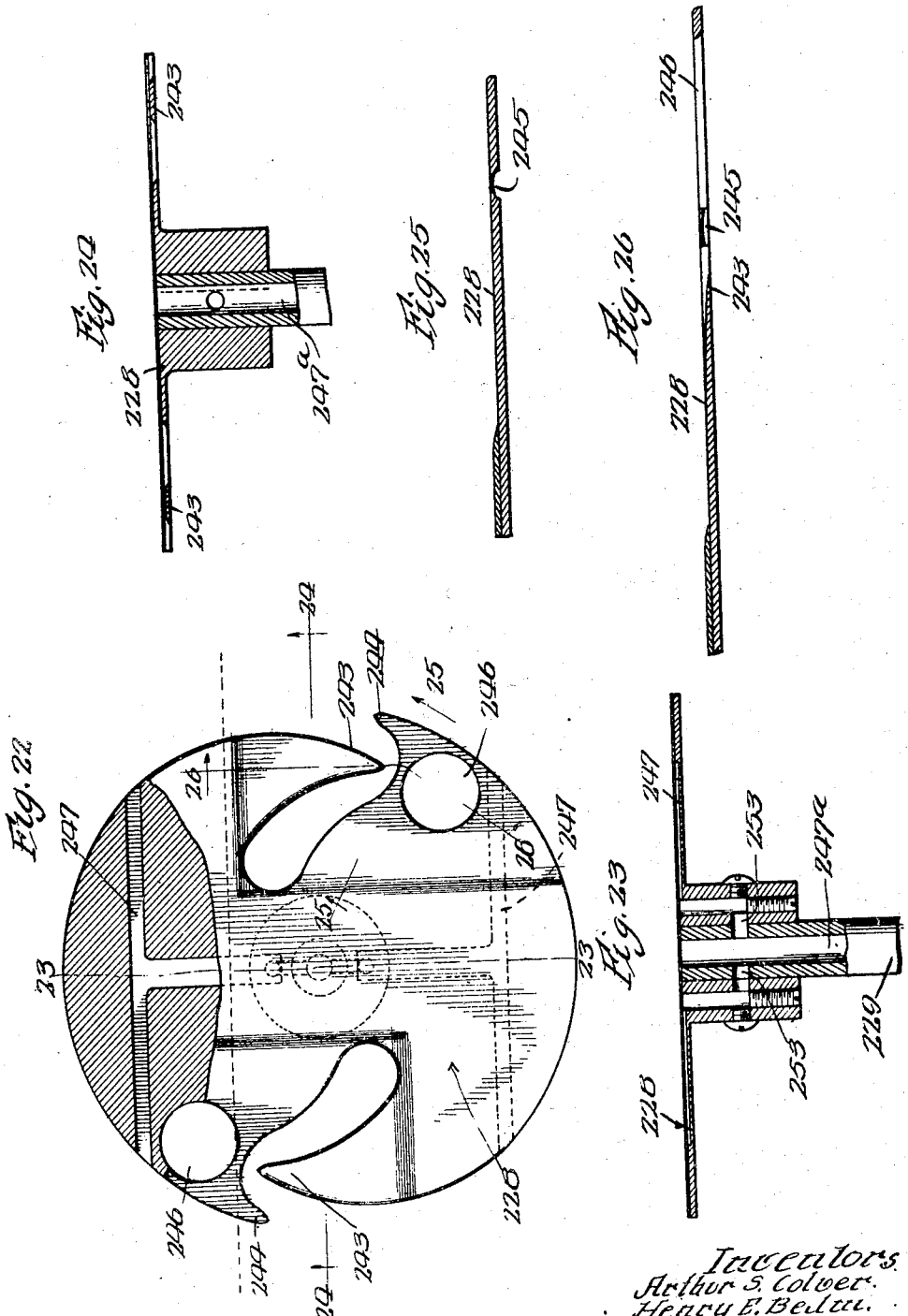

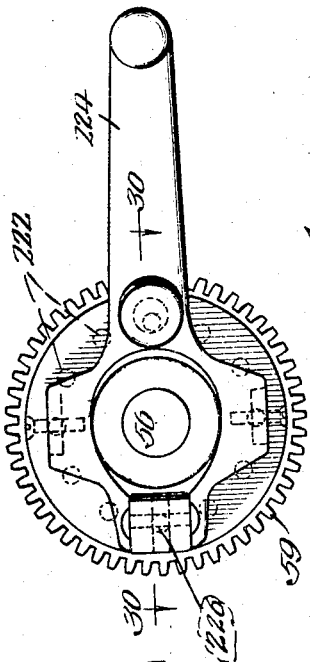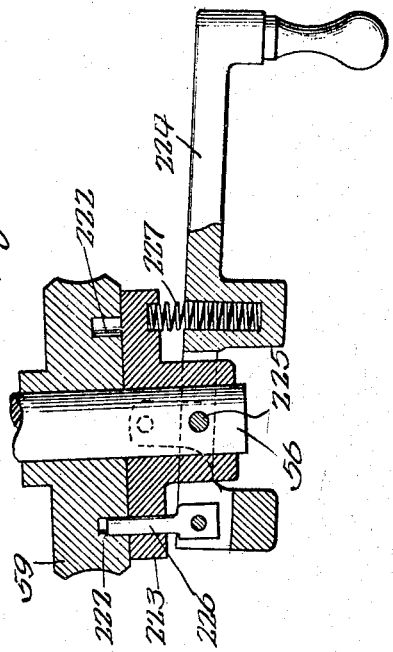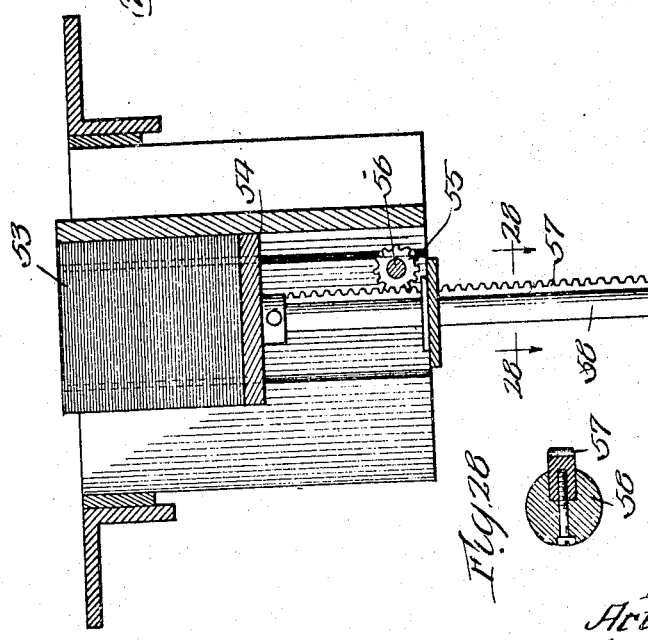

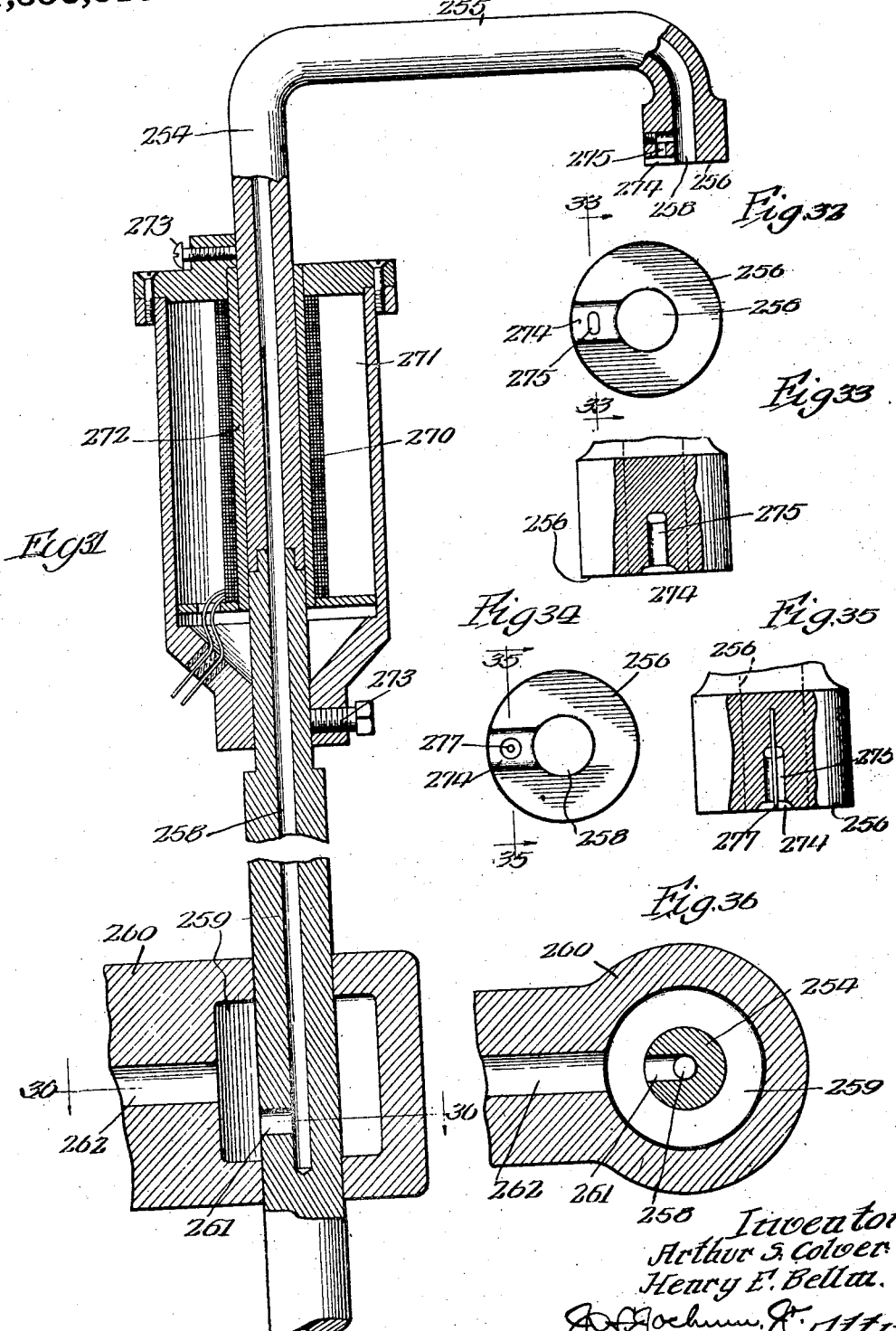

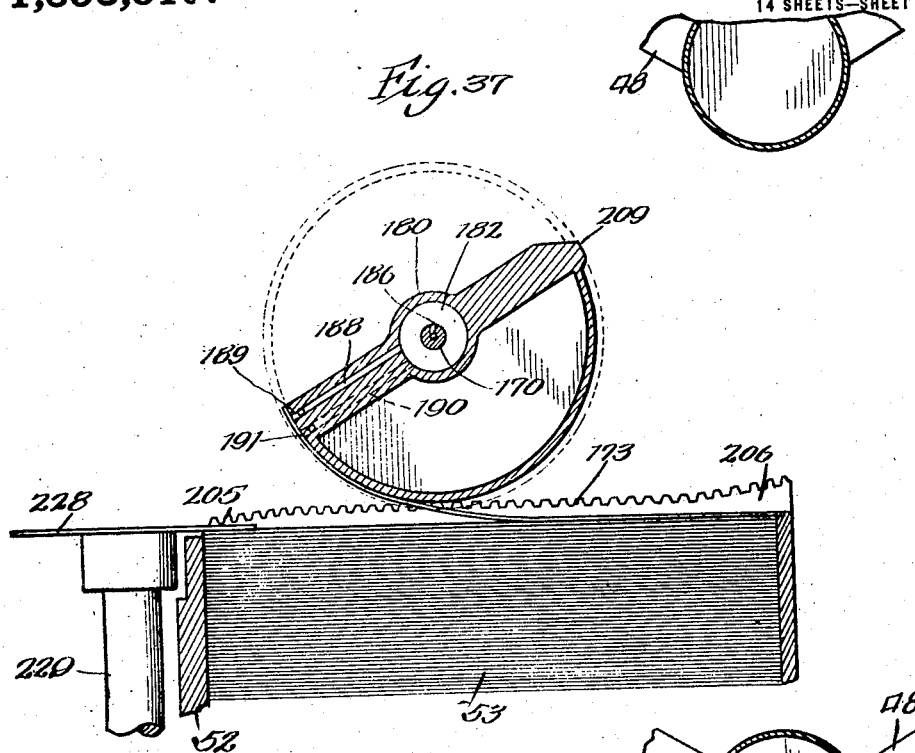
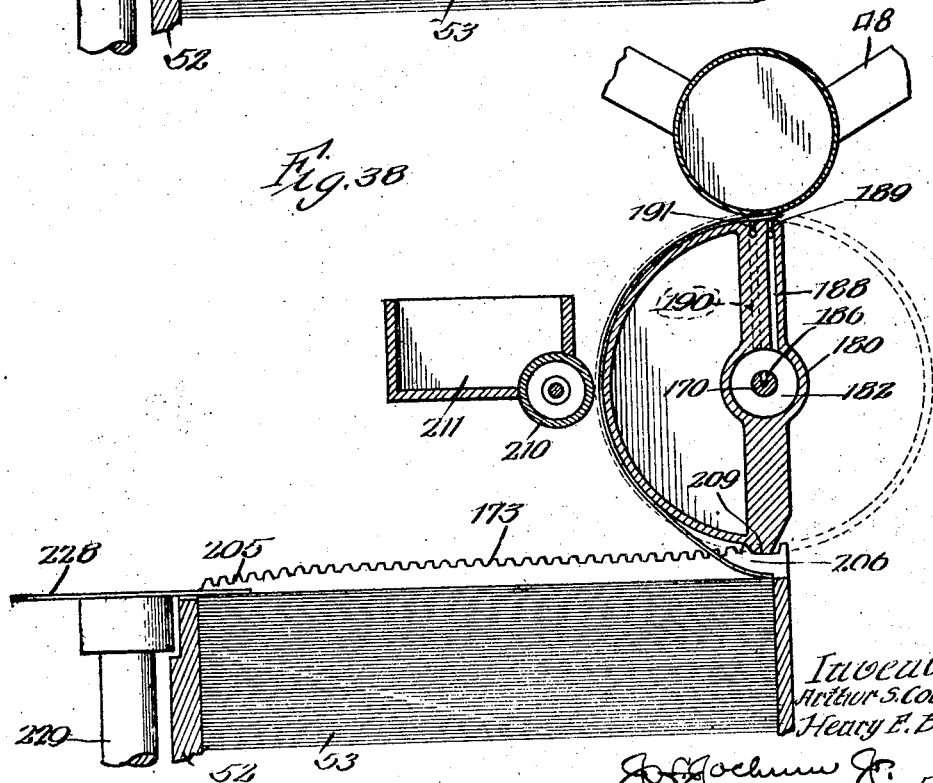

A. S. COLVER AND H. E. BELLM.
LABELING MACHINE.
APPLICATION FILED NOV. 6, 1916.

1,353,519.

Patented Sept. 21, 1920.
14 SHEETS—SHEET 14.

Inventors,
Arthur S. Colver.
Henry E. Bellm.
By J. F. Jochum Jr. Atty.

UNITED STATES PATENT OFFICE.

ARTHUR S. COLVER AND HENRY E. BELLM, OF CHICAGO, ILLINOIS, ASSIGNORS OF ONE-THIRD TO CHARLES C. COLVER, OF CHICAGO, ILLINOIS.

LABELING-MACHINE.

1,353,519.

Specification of Letters Patent.   Patented Sept. 21, 1920.

Application filed November 6, 1916. Serial No. 129,879.

*To all whom it may concern:*

Be it known that we, ARTHUR S. COLVER and HENRY E. BELLM, citizens of the United States, residing at Chicago, in the county of Cook and State of Illinois, have invented certain new and useful Improvements in Labeling-Machines, of which the following is a specification.

This invention relates to improvements in labeling machines, and one of the objects of the invention is to provide an improved machine of this character, adapted to handle and apply to an article, preferably cylindrical articles, a label, commonly known as a "tempered" label, and which label has been soaked previous to its application to the article. The labels are stacked and soaked and then the liquid is pressed out of the stack, the stack then placed in a label supply box from which the labels are individually and automatically removed while moist and as needed, from the top of the stack to be fed to the article to which it is to be applied.

A further object is to provide improved means whereby paste may be applied to the lap end of the label, or the end which overlaps the other end that is already applied to the article.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating the invention and in which;

Figure 1 is an elevation of one side of a machine of this character constructed in accordance with the principles of this invention.

Fig. 2 is an enlarged elevation, similar to Fig. 1, and with parts omitted for the sake of clearness.

Fig. 3 is an end view taken on the line 3—3, Fig. 1, partly in elevation and partly in section.

Fig. 4 is a view taken on line 4—4, Fig. 3, partly in elevation and partly in vertical section.

Fig. 5 is a detail vertical sectional view, taken on line 5—5, Fig. 3, with parts omitted.

Fig. 6 is a front elevation of one of the holding devices for the article.

Fig. 7 is a sectional view on line 7—7, Fig. 6.

Fig. 8 is a detail sectional view on line 8—8, Fig. 5.

Fig. 9 is a detail sectional view of the other holding element for the article.

Fig. 9$^a$ is a view of a detail.

Fig. 10 is an enlarged detail view, partly in elevation, partly in section and partly broken away, showing the article feeding and holding mechanism.

Fig. 11 is a diagrammatic view as taken on line 11—11, Fig. 10.

Fig. 12 is a front view of the parts shown in Fig. 13.

Fig. 13 is a detail view partly in elevation and partly in section taken on line 13—13, Fig. 10.

Fig. 14 is an enlarged detail side elevation of the article feeding mechanism and article support.

Fig. 15 is a longitudinal sectional view of Fig. 14.

Fig. 16 is a diagrammatic view showing the temporary support for the article during the operation of feeding and discharging the articles.

Fig. 17 is a detail sectional view taken on line 17—17, Fig. 4.

Fig. 18 is a detail sectional view taken on line 18—18, Fig. 4.

Fig. 19 is an enlarged detail view, partly in elevation and partly in section of the mechanism for picking up the label and conveying it to the article.

Fig. 20 is a view taken on line 20—20, Fig. 21.

Fig. 21 is a sectional view taken on line 21—21, Fig. 20.

Fig. 22 is a top plan view partly in section of the separator element for the labels.

Fig. 23 is a sectional view taken on line 23—23, Fig. 22.

Fig. 24 is a sectional view taken on line 24—24, Fig. 22.

Fig. 25 is a sectional view taken on the line 25—25, Fig. 22.

Fig. 26 is a sectional view taken on line 26—26, Fig. 22.

Fig. 27 is an enlarged detail vertical sectional view of the label box showing the adjustable follower for feeding the stack of labels.

Fig. 28 is a detail sectional view on line 28—28, Fig. 27.

Fig. 29 is a detail plan view of a clutch mechanism whereby the follower in the label box may be quickly adjusted.

Fig. 30 is a sectional view taken on line 30—30, Fig. 29.

Fig. 31 is a view partly in elevation and partly in vertical section of the heating device for the labels.

Fig. 32 is a bottom plan view of the nozzle end of the heater.

Fig. 33 is a view taken on line 33—33, Fig. 32.

Fig. 34 is a view similar to Fig. 32 of a modified form of nozzle.

Fig. 35 is a sectional view taken on line 35—35, Fig. 34.

Fig. 36 is a detail sectional view taken on line 36—36, Fig. 31.

Fig. 37 is a diagrammatic view partly in vertical section and partly in elevation, showing one step in the method of removing the uppermost label.

Fig. 38 is a view similar to Fig. 37, showing the parts in position to deliver the label to the article.

Figure 39:
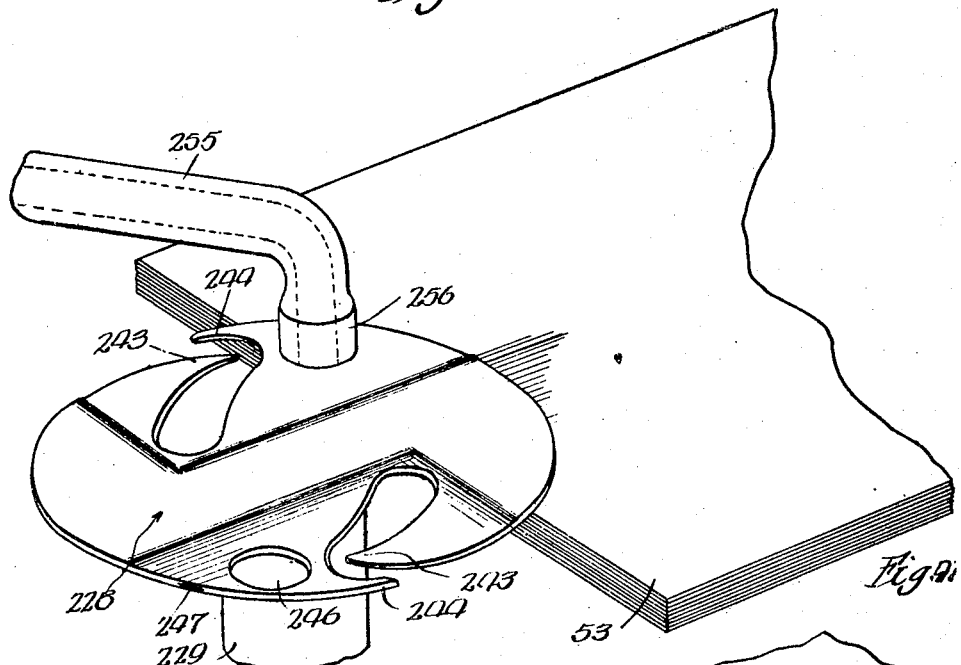

Fig. 39 is a detail perspective view showing the relative positions which the separator and heater will assume with respect to each other and to the top label prior to the removal of the uppermost label.

Figure 40:
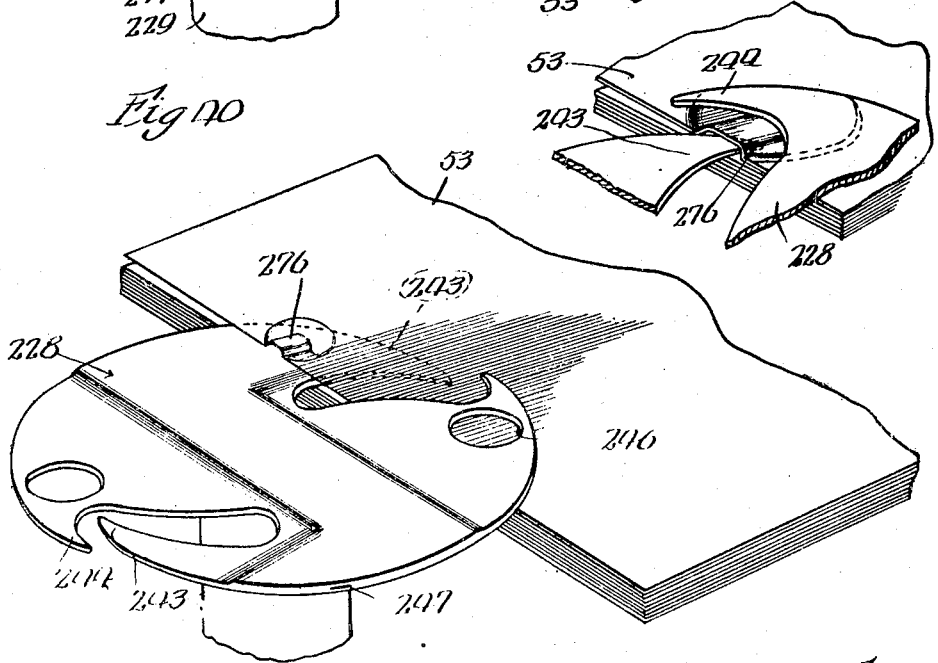

Figs. 40 and 41 show successive steps in the operation of removing the uppermost label from the stack.

The mechanism is supported by a frame work comprising a bed 45 and uprights 46 suitably arranged, and mounted upon the bed are supports 47 which latter carry a rotatable article receiver 48, the latter comprising spaced members connected by means of a shaft 49 and in which carrier a plurality of article clamping and holding devices are provided. These holders are arranged in pairs opposite each other and between which the article is adapted to be clamped so that when the carrier 48 is rotated, the article will be conveyed in a position to have the paste or glue first applied to the article and then the article advanced to a position in which the label will be presented thereto and wound therearound.

Arranged beneath the carrier 48 and suitably spaced therefrom, is a label box 52 in which the labels 53 are arranged. The labels are first stacked and then soaked, after which the water is pressed from the stack, and the moistened or tempered labels are placed within the label box upon an adjustable follower 54, which constitutes the bottom of the box.

This follower may be adjusted in any suitable manner, intermittently and automatically during the operation of the machine, so as to advance the pile when the uppermost label is removed therefrom. This may be accomplished in any suitable manner, preferably by means of suitable gears 55 connected with a shaft 56 and which gears mesh with racks 57 carried by stems 58 that are secured to the follower 54. Connected with the shaft 56 is a worm gear 59 meshing with a worm 60 (see particularly Figs. 3 and 4), the latter being secured to a shaft 61 that has connected therewith a ratchet wheel 62 adapted to be operated by a pawl 63 carried by an arm 64. Connected with the arm 64 is a rod 65 which carries an adjustable stop 66, adapted to limit the movement of the rod 65 in one direction under the influence of a spring 67, and which spring operates to move the rod 65 and pawl 63 in a direction to feed the follower 54.

The rod 65 is adapted to be reciprocated by one of a pair of arms 68 which are connected at one end by means of a shaft 69 (see particularly Fig. 3) journaled in suitable bearings and which shaft is provided with a crank 70 having an arm 71 connected thereto. The arm 71 (see also Fig. 1) is provided with an anti-friction roller 72 adapted to project into a groove 73 of a cam 74, which latter is secured to rotate with a shaft 75 that is rotated by means of a worm gear 76 secured to the shaft 75 and which meshes with a worm 77 secured to the main drive shaft 78 of the machine. This shaft 78 is mounted in suitable bearings 79 and receives its motion in any suitable manner, preferably from a pulley 80, fixed to the shaft 78 and which pulley 80 is adapted to be connected with a loose pulley 81 by means of suitable clutch mechanism 82 adapted to be shifted so as to lock or release the pulleys 80, 81 in any suitable manner such as by means of a cam 83 having a suitable operating handle 84 and which cam operates upon a lever 85 which is controlled by a spring 85ª, so that when it is desired to rotate the shaft 78, and oscillate the arms 68, the clutch mechanism may be rendered active by means of the cam 83.

When one of the arms 68 is moved in one direction, it will engage a collar 86 on the rod 65 to move the latter in a direction to cause the pawl 63 to assume a new position on the ratchet 62, so that when the arm 68 moves in the opposite direction, the spring 67 will operate to move the ratchet wheel 62.

The article carrier 48 is adapted to be intermittently rotated and for this purpose there may be provided a ratchet wheel 87 which is secured to rotate with the shaft 49, and with which ratchet a pawl 88 carried by an arm 89 coöperates, and which arm is pivotally supported preferably by the shaft 49. Connected with the arm 89 is a rod 90 having an elongated slot 91 in its body and through which slot the shaft 94ª passes. A cam 93 is connected with the shaft 94ª and operates on a roller 90ª on the rod to shift the latter. A gear 94 (see particularly Figs. 1, 3 and 4) is connected with the shaft 94ª and meshes with a gear 95 on the shaft 96, and this shaft 96 is rotated by means of a gear 97 which meshes with a gear 98 on the shaft 75. The rod 90 is given a positive movement in one direction by means of the cam 93 and pin 92 and is returned in the opposite direction in any suitable manner such as by means of an elastic member 99 coiled about the rod and abutting a collar 100 connected with the rod and also a collar 101 which is suitably connected to the frame of the machine.

The articles are held in the carrier 48 by suitable clamping or holding devices, comprising coöperating members arranged on opposite sides of the carrier and between which the article is held.

As the construction and operation of each of the holding devices is the same, the description of one will apply equally as well to them all.

The holders embody an element 102 (see particularly Figs. 9 and 10), the inner face of which is recessed to receive one end of the article, and connected with the element is a stem 103, which is adapted to slide longitudinally in a suitable bearing in one of the elements of the carrier 48.

Interposed between the face of the element of the carrier and the rear face of the element 102 is an elastic member 104 which tends normally to move the element in a direction toward the article and this forward movement is limited by means of a collar 105, secured to the stem 103 on the opposite side of the carrier element.

A rotatable clutch element 106 having an operating handle 107 is loosely mounted upon the stem 103, between the collar 105 and the rear face of the carrier element 48 and is of a size to permit the stem 103 to be shifted longitudinally in its bearing. One of the faces of the clutch element 106 is provided with a recess 108, adapted to receive a projecting portion 109 on the face of the carrier element 48 and the element is also provided with diametrically opposed notched portions 110 in the recessed face, and which extend transversely of the recess 108 and which notches are adapted to receive the edges of the face 109 of the carrier element 48, (as shown more clearly in Fig. 10), when the collar 106 is rotated, so as to hold the element 102 retracted at predetermined points in the operation of the mechanism. The coöperating element 111 (see Figs. 6 and 7) of the article holder is connected with a stem 112 that is adapted to slide in a sleeve 113 mounted in a bearing in the other carrier element 48. The element 111 is provided with a clutch face 114 which is adapted to coöperate with a clutch element 115 that is secured to the sleeve 113, so as to move the clutch faces 114, 115 into and out of engagement with each other.

The stem 112 is adapted to be limited in its movement in one direction by means of a gear 116, secured thereto, and which gear is also adapted to be rotated to rotate the stem and the member 111, and this rotary motion is conveyed through the article which is clamped between the elements 102, 111 to the element 102, during the operation of applying the label to the article. This rotary motion is imparted to the gear 116 by means of a gear 117 loosely mounted upon the shaft 49 and which meshes with an intermediate gear 118 that in turn meshes with the gear 116, so that when the gear 117 is rotated, and when the clutch faces 114, 115 are in engagement, the articles will be rotated with respect to the carrier 48.

The gear 117 receives its motion by means of a sprocket wheel 119, which is connected with the gear 117 for rotation therewith and over which sprocket wheel, a sprocket chain 120 passes. The sprocket chain also passes over another sprocket 121 that is connected with a shaft 122, the latter being rotated by means of a gear 123 secured thereto and with which gear another gear 124 connected with a shaft 125 meshes, the shaft 125 in turn being rotated in any suitable manner, preferably from a shaft 78$^a$ through the medium of the sprocket wheels 126, 127 over which a sprocket chain 128 passes. Thus it will be manifest that an intermittent rotation will be imparted to the article carrier 48 and a continuous rotation will be imparted to all of the article holders, supported by the carrier, when the various clutches of the holders are in coöperating relation. The shaft 78$^a$ is continuously rotated from the pulley 81 by means of a suitable connection such as a sprocket chain 81$^a$.

It is desirable that the article holder from which the article is to be discharged after having the label applied thereto, and the holder which is to receive the article to have the label applied should be arrested in their rotary motion during the time that the article is being discharged from one and the article is being received by the other holder.

To accomplish this, means are provided whereby the clutch faces 114, 115 of the respective holders are separated or brought into inoperative relation. A suitable means for accomplishing this end comprises a cam 129 (see particularly Figs. 1, 2 and 10), which is arranged adjacent the path of movement of the stems 112 and is so positioned that when the respective holders are approaching the positions where the article is to be delivered from the mechanism and where another article is to be received, the ends of the stem of the respective holders will ride over the cam 129 and the stems will be shifted longitudinally through the sleeves 113 to separate the clutch faces 114, 115 and the articles will then be arrested in their rotary movement.

It is also necessary to separate the elements 102, 111 so as to permit the discharge of the article and the reception of another article. This may be accomplished in the following manner. When the stems 112 are shifted longitudinally to arrest the rotary motion of the holders, the element 102 is also shifted longitudinally in its bearing but not to a sufficient distance as to move the clutch faces 108, 109 (see Fig. 9) out of coöperative relation. In order therefore to separate the elements 102, 111, the collar 106 is given a rotary movement with respect to the stem 103 causing the inclined face 108 thereof to ride over the inclined face 109, thereby drawing the element 102 with the stem 103, allowing the article to drop from holder. In order to maintain the elements 102, 111, separated, the collar 106 is provided with the notches 110, which, when the collar is rotated are moved to a position that the edge of the face 109 will enter the notches and the member 102 will be held in its adjusted position, against the stress of the spring 104. To again position the element 102 to clamp the article, the collar 106 is rotated to its normal position. The spring 104 also compensates the varying lengths of the article.

This adjustment of the element 102 first in one direction and then in the opposite direction is accomplished automatically in any suitable manner such as by means of a pair of gears 130, 131, which intermesh and from which gears respectively project lateral pins or arms 132, 133. The pins 132, 133 are adapted to act successively upon the handles 107 of the collars 106, so that when the gears 130, 131 are rotated by means of a sprocket chain, 134, passing over a suitable sprocket connected with one of the gears 130, 131, and over a sprocket 135 on a shaft 136, the collars 106 will be successively rotated (see particularly Fig. 11) and the elements 102 will be shifted. As the labeled article in the carrier 48 approaches the point of discharge, the pin 132 on the gear 130 (see Fig. 11) will act upon the handle 107 of the collar 106 to shift that element 102, thereby discharging the article and the element 102 will be locked in its opened position in the manner already described and as shown more clearly in Fig. 10.

The carrier 48 is then further advanced so that the separated holders approach the position to receive another article. As soon as the incoming article is positioned between the elements 102, 111, the handle 107 of that holder, will have assumed a position that the pin 133, on the gear 131, will act upon the arm 107 to rotate the collar 106 and thereby release the element 102 so that the spring 104 will return the element 102 and cause the article to be clamped in the holder.

The shaft 136, receives its motion in any suitable manner such as by means of a sprocket 137, over which a sprocket chain 138 passes and which chain also passes over a sprocket 139 (see Figs. 1, 3 and 4) connected with the shaft 94$^a$.

Arranged in a suitable position so as to catch the article as it is released by its holders, is a support 140 (see particularly Figs. 10, 14 and 15) which is mounted to swing about a pivot 141. A similar support 142 is arranged in a convenient position within the path of movement of the article from a supply chute 143 so as to catch the article as it is delivered from the supply and hold it in position to be gripped by the article holder. This support 142 is mounted to swing about a pivot 144, and the supports 140, 142 are respectively provided with teeth 145, 146 which intermesh so that when one of the supports is moved about its pivot by means of a rod 147 actuated by a cam 148, that preferably moves between spaced rollers 149 on the rod to shift the latter, both of the supports will be simultaneously moved into and out of operation position. The cam 148 is preferably connected with the shaft 136, to rotate therewith and connected also with this shaft are laterally spaced gears 150 (see also Figs. 12 and 13) which mesh with gears 151 connected with shafts 152 journaled in suitable bearings adjacent the article delivery chute 143. Connected with each of the gears 151, that are preferably arranged on opposite sides of the delivery chute, are semi-circular cup-shaped members 153, the walls of which are tapered or cam shaped as at 154. These elements 153 are arranged in the path of movement of the articles in the chute and are adapted to be rotated by the gears 150, 151, to position the elements 153 to pass between the first two articles and thereby separate the articles so that the first article will be delivered to the article carrier, while the element 153 forms a stop for the following articles, and a continued movement of the element 153 in the same direction will permit the next article to pass from the chute, while the element 153 will again pass between the next two articles. Obviously the parts are so timed that during the interval of rest of the steps of rotation of the carrier 48, one article will be discharged from the mechanism and another article will be supplied to take its place. As soon as the stems 112 pass out of engagement with the cam 129, the article will be given a rotary motion with respect to the carrier, both during the intervals of rest of the carrier 48 and also during its advancing movement.

While the article is being advanced by the carrier 48, it is also being rotated with respect to the carrier and during this rotary movement of the article, it is advanced to a rotary paste or glue applying brush 155 (see particularly Figs. 2 and 5) and to which brush paste is applied from a supply box 156 through the medium of a roller 157, that is connected with the shaft 122, the glue being forced forwardly in the box toward the roll 157 by means of a spiral or conveyer 158. The brush 155 receives its rotary motion from the shaft 122 preferably by means of a sprocket chain 159 which passes over sprocket 160, 161, secured respectively to the brush and the shaft 122. Thus it will be manifest that while the article is being rotated in the carrier, the paste is being applied thereto so that the article when it is advanced to a position to have the label applied thereto, the paste or glue will be on the article and not on the label.

An adjustable scraper 162 may be provided for removing excess glue from the roller 157 and the box 156 may be provided with an adjustable wall 163 so as to permit particles of the glue which have adhered to the roller 157 to pass back into the glue box. Obviously the roller 157 is so mounted that it will project into the box 156.

Motion may be imparted to the conveyer 158 in any suitable manner such as by means of a sprocket chain 164 passing over sprockets 165ª, 166ª, secured respectively to the shaft of the element 158 and shaft 125.

Obviously the box 156 may be mounted for suitable adjustment with respect to the roller 157.

After the glue has been applied to the article in the manner set forth, the article is then moved into a position in which the label is presented thereto and wound therearound. The means by which the label is presented and applied to the article will now be described. In the description and claims referring to the label feeding mechanism, and for the purpose of uniformity in terminology, the term "drum" will be employed and it is understood that this term will designate either an entire drum or a semi-circular drum.

Connected with the arms 68 (see particularly Figs. 1, 3, 19 and 21) are links 165, 166 and the arms 68 are connected to move in unison by means of a cross bar 167.

The links 165 terminate in bearing 168, 169, in which bearings a shaft 170 is journaled, and the extremities of the shaft project beyond the bearings and have secured thereto gears 171, 172, which are adapted to run respectively upon racks 173, 174, arranged along opposite sides of the label box 52. The bearings 168 169 are respectively provided with chambers 175 176 and the links are provided respectively with passages 177, 178, having communication with the chambers.

Loosely supported by the shaft 170 is a drum 179, which is also provided with bearings 180, 181, provided respectively with chambers 182, 183 and the shaft is provided with tubular extremities 184, 185 that communicate respectively with the chambers 182, 183, by means of passages 186, 187. Leading from the chambers 180 and communicating therewith is a passage 188 which extends transversely of the periphery of the drum and is provided with outlet openings 189 across the periphery. A similar passage 190 leads from the chamber 183 and extends across the periphery of the drum adjacent the passage 188 and has discharge openings 191 (see particularly Fig. 19).

Connected with the tubular link 165 is a flexible pipe 192 (see particularly Fig. 3) which is in turn connected with a valve mechanism 193 that controls a passage leading from an exhaust mechanism 194 (see also Fig. 17) and the valve is provided with a stem 195 adapted to be shifted by means of a cam 196 secured to the shaft 197, journaled in suitable bearings 198, and which bearings are mounted preferably upon the label box 52. The shaft is rotated preferably by means of a sprocket chain 199 which passes over suitable sprockets on the shaft 197 and also on the shaft 75.

When the shaft 197 is rotated, the cam will operate upon the valve stem 195 to open the valve and thereby permit a suction to be created through the openings 189 of the passage 188 to pick up the end of the label, as will be described and at the proper time, the cam will permit the valve stem 195 to operate in the opposite direction to shut off the exhaust.

A flexible pipe 200 is connected with the passage 178 of the link 166 and also with a valve mechanism 201 which controls a passage 202 of a blast mechanism. The valve is provided with a stem 203 adapted to be operated by a cam 204 and the cams 204, 196 are so arranged with respect to each other, that when one of the cams is operating to open its respective valve, the other cam is operating to permit its valve to close. In this way there is first created a suction through the drum to hold the label thereto and this suction is then released and a blast is directed through the drum to blow the end or portion of the label therefrom which has been previously held by the suction. Obviously any form of suction or blast mechanism may be employed which is suitable for the purpose.

The drum is of such a size and is so mounted that its periphery will stand in close proximity to the edge of the label, when the drum is in its initial position, that is to say, when the passages 189, 191 stand in close proximity to the edge of the label at the front end of the label box 52. The racks 173, 174 are provided at the forward extremities with downwardly inclined portions 205 so as to permit the periphery of the drum to move in close proximity to the label. When the arms 68 are rocked in the manner already described, to move the gears 171, 172 backwardly along the racks 173, 174 the drum will be rotated and as the edge of the label is held to the drum during this movement, see Fig. 37, the label will be wound around the drum, with the face of the label in proximity to the periphery of the drum. The drum will be thus rotated as it moves along the racks until it reaches the other end of the label box and at the point where the racks 173, 174 are provided with inclined portions 206. This will cause the drum to be bodily elevated so that the extremity of the label which is held to the drum by suction will be presented to the article having the glue thereon, and the drum will be released with respect to the shaft 170, in a manner to be described so that the drum will be rotated by means of a friction wheel 207 (see particularly Fig. 3), connected with the element 111 (see also Fig. 7), and which is brought into contact with a friction wheel 208 connected with the drum, when the drum is elevated by means of the downwardly inclined portions 206 of the racks 173, 174. At the time that the end of the label which is held by suction to the drum, contacts with the pasted article, the suction on the label will be released and the blast will be directed through the drum to blow the end of the label from the drum and against the article. In order to paste the lap end of the label, which is the free end or the end which overlaps the edge which has been already pasted to the article, the drum is provided with a portion 209 which projects beyond the periphery thereof (see particularly Figs. 37 and 38), and over which portion the free end of the label projects. As the drum is rotated, this projecting portion 209 of the drum will cause the end of the label resting thereon to contact with the paste roll 210 that receives its supply from a paste box 211 and which roll and box are preferably mounted upon extensions 212 of the links 165, 166, so that only the lap end of the label will have paste applied thereto and which will be sealed down against the article as the article revolves and takes a label from the drum.

Assuming that the drum is in a position to start to pick up the end of the label from the label box and with the exhaust opening 189 adjacent the label, and as the links 165, 166 are moved backwardly it is desirable that the drum shall be rotated about its axis by means of the gears 171, 172, rolling over the racks 173, 174 so as to wind the label about the drum. It is therefore necessary to lock the drum for rotation with the gears.

This may be accomplished in any suitable manner but preferably by means of a disk 213, which in turn is connected with a sleeve 214 (see particularly Figs. 20 and 21) connected to rotate with the gear 171, preferably by being keyed to the shaft 170. A catch 215 is pivotally mounted upon the body of the friction wheel 208 and the disk 213 is provided with a notch adapted to receive the catch. A spring 216 is provided which tends normally to move the catch in a direction to enter the notch of the disk 213, when the drum reaches a position with respect to the disk so that the spring will draw the catch into the notch and lock the drum for rotation with the gear 171. Connected with the catch 215 is a trip device 216 that projects beyond the periphery of the friction wheel 208 so that when the friction wheel 208 contacts with one of the friction wheels 207 (see Fig. 7) the arm 216 at a predetermined point will engage the periphery of the friction disk 207 to trip the catch 215 and release the drum. This releasing of the drum will be accomplished at the time when the drum reaches the position with respect to the label box 52 as shown in Fig. 38 and when the drum is thus released, the rotation of the friction wheel 207 will rotate the wheel 208 and with it the drum so that the drum will be rotated about is own axis to permit the label to be unwound therefrom and wound upon the article.

After the label has been taken from the drum, the drum will be in the position shown in dotted lines in Fig. 38 and in order to prevent the drum from being rotated still further in the same direction, another catch 217 is provided, preferably on the other side of the drum and this catch is adapted to coöperate with a notch 218 in a disk 219, which latter is preferably connected with the link 166 through the medium of the bearing 169, the disk 219 being held against rotation. When the drum is rotated from the position shown in full lines in Fig. 38 to the position shown in dotted lines in said figure, the catch 217 will ride about the periphery of the disk 219 until it reaches the notch 218 into which notch the catch will move and the drum will be held in the dotted line position shown in Fig. 38, until the catch is released.

By the time the drum reaches the dotted line position shown in Fig. 38, the label will have been delivered from the drum to the article, and the drum will then be ready to be moved back to its initial position to pick up another label. The drum while thus locked will be bodily advanced toward the forward end of the label box and just before it reaches the limit of its forward movement, the catch 217 will be engaged by a trip device 220 (see particularly Fig. 3) and will be moved out of the notch 218 thereby unlocking the drum with relation to the axle 170, and as the drum is overbalanced on one side, it will move by gravity about the axis 170 from the position shown in dotted lines in Fig. 38 at the forward end of the label box, to its proper initial starting position, or into a position where the exhaust nozzle 189 will be adjacent the body of the label at the front of the label box. As the drum approaches this position, or the movement about its axis 170, the catch 215 will assume a position to enter the notch in the disk 213 and the drum will then be locked for rotation with the shaft, the catch 217 in the meantime having passed out of engagement with the trip device 220. Thus it will be manifest that the drum will then be in a position to pick up the forward edge of the next label. Obviously as the labels are fed from the label box, the follower 54 will feed the labels into position that the uppermost label may be removed. Should it be desired to lower the follower, without operating the remaining mechanism, this may be accomplished by means of a handle 221 secured to the ratchet wheel 62 (see Fig. 17), if the follower is to be moved a short distance. If it is desired to move the follower to any considerable extent, a clutch device may be provided (see particularly Figs. 17, 29 and 30). The gear 59 is mounted loosely upon its shaft 56 and is provided with seats 222 opening through one of its lateral faces and adjacent which face is arranged a collar 223 that is secured to the shaft 56. An operating handle 224 is pivoted intermediate its end as at 225 and carries a laterally projecting pin 226 which projects through a suitable opening in the collar 223 and is adapted to enter the sockets 222 and to be withdrawn therefrom. A spring 227 may be provided which tends normally to move the handle 224 about its pivot in a direction to cause the pin to enter one of the seats 222 and thereby lock the gear 59 for rotation with the shaft 56.

When it is desired to quickly lower or raise the follower 54, (see also Fig. 27), the handle 224 is moved in a direction to withdraw the pin 226 from the seat 222, and while the pin is thus removed, the shaft 56 is rotated by the handle 224 and this in turn rotates the gear 55 which is secured to the shaft 56 and which meshes with the teeth 57 of the rack carried by the stem 58 of the follower. After the follower has been thus moved to the desired position, the handle 224 may be released at which time, the spring 227 will move the pin 226 into a position to enter one of the seats 222 and thereby again lock the gear 59 for rotation with the shaft 56.

As has already been stated, this machine is adapted for handling tempered or moistened labels, which have been compressed by pressing the water therefrom. As the drum starts to take up the forward edge of the label by suction, it will be manifest that if the labels were separated in some means at their forward edge by the time the suction in the drum operates to elevate the edge of the label, this elevation or separation of the label from the remaining labels in the box will be facilitated. In order to accomplish this, there is provided, which for the sake of convenience throughout the specification and claims, will be designated as a separator, shown more clearly in Figs. 22 to 26 and 39 to 41.

This separator in the present form of the invention is shown in the form of a disk designated generally by the reference numeral 228 which is mounted to revolve about an upright axis, (see also Fig. 18) preferably in the form of a shaft 229, to which the separator is secured and which shaft is journaled to rotate in a suitable bearing 230, secured to a fixed portion of the mechanism, preferably the end of the label box 52, (see also Fig. 4). This bearing may be of any desired length and the shaft 229 is adapted to slide longitudinally therethrough so that the separator 228 may be elevated or lifted out of contact with the edge of the label when desired, but when in operation and as a portion of the separator extends over the edge of the label box, and over the edges of the labels, the weight of the shaft, together with the separator, and a weighted arm 231, which is pivotally supported as at 232 and connected in any suitable manner to a collar 234 in which the shaft 229 is journaled, will cause the separator to rest upon the edge of the label. This shaft 229 is rotated preferably by means of a gear 235, with which the shaft has a sliding connection and which gear in turn meshes with a gear 236 connected with a shaft 237, which shaft is driven preferably by means of a sprocket chain 238, passing over sprockets on the shafts 237 and 94ª.

A clutch 239 of any suitable construction may be provided on the shaft 237 and which clutch is controlled by a suitable cam 240 on the shaft 94ª and which cam operates a shifting rod 241 connected with an arm 242 for controlling the clutch 239.

The separator as shown more clearly in Fig. 22 is what might be termed a double separator, that is, it is provided with two horns, 243, preferably located diametrically opposite each other and which horns are arranged adjacent a projecting ear 244, the ear projecting for some distance beyond the periphery of the horn and being provided with a bridge or downwardly opening recess 245 arranged in alinement with the horn 243.

Passing through the body of the separator, behind the bridge 245, and in advance of the horn, is an aperture or opening 246, for a purpose to be hereinafter described, and the separator is provided in its body portion with passages 247 opening through the periphery of the separator as shown more clearly in Figs. 39, 40.

The shaft 229 is provided with a passage 247ª therein and which passage has connection with a valve chamber 248, controlled by a valve device 249, and the chamber has connected with it a blast pipe 250, so that when the separator has passed between two labels, the valve will be operated by means of the stem 251 actuated by a cam 252 on the shaft 94ª, to permit a blast of air to be blown through the passages 247 to assist in separating the label and also coöperating with the suction through the opening 189 in the drum to connect the ends of the label with the drum.

The passage 247ª in the shaft 229 has communication with the passage 247 in the separator, preferably by means of the opening 253 in the body of the separator as shown more clearly in Fig. 23.

The separator is of such a size that when the horn 243 passes between two of the labels, the edge of the separator will follow the horn and will act as a means for holding down the forward edge of the next lowermost label as shown more clearly in Figs. 39 to 41.

It is desirable to elevate a portion of the uppermost label so as to permit the horn 243 to pass between the labels and this may be accomplished in any suitable manner, preferably by means of raising a blister on the label adjacent its edge. For this purpose there is provided a heater 254 (see particularly Figs. 18, and 31 to 36 and 39).

The heater is of any desirable size and configuration suitable for the purpose but is preferably provided with an upright body portion having an arm 255 projecting laterally therefrom and the extremity of the arm is deflected downwardly to form a label engaging extremity 256.

The heater is mounted to slide in bearings 257 and is also adapted to be rotated in these bearings. The body portion of the heater is provided with a passage 258 which communicates with a chamber 259 in another bearing 260 through a channel 261, and the chamber is of such a length as to permit of a longitudinal shifting movement of the heater and still maintain a communication between the chamber 259 and the passage 258.

Leading from the chamber 259 and preferably located in the bearing 260 is a passage which is connected with suitable exhaust mechanism by means of a pipe 263. The passage 262 is controlled by suitable valve mechanism 264 having a stem 265 adapted to be shifted by means of a cam 266 connected with the shaft 94ª so that the suction will be established or cut off by the operation of the valve.

The passage 258 in the heater extends through the extremity 256 so that when the extremity 256 of the heater rests on the uppermost label and the valve mechanism 264 is opened, suction will be created through the passage 258 and this will raise a portion of the uppermost label, the extremity 256 of the heater having previously been moved to a position that it will contact the uppermost label (see Fig. 39), by passing through the opening 246 in the separator 228.

The heater is adapted to be elevated so as to move the extremity 256 thereof out of the opening 246 of the separator, by means of a cam 267 and which cam is connected to the shaft 94ª in order to allow the separator to be rotated.

When the cam 267 elevates the heater and the extremity 256 is moved out of the opening 246 of the separator 228, the heater is rotated in its bearings preferably by means of a cam 268 engaging an arm 269 which is connected with the heater stem, and thereby shift the extremity of the heater out of the way of the drum.

Suitable heating mechanism may be provided for the heater and in the present invention such mechanism is shown as being an electric heating coil 270 which coil is arranged within a chamber 271 through which the upright portion of the heater 258 passes, and the chamber is provided with a shell 272 around which the coil 270 is wound and through which shell the heater passes. The heating mechanism is secured to the heater in any suitable manner such as by means of fastening devices 273.

The extremity of the heater 256 is provided with a recess or downwardly opening arched shaped portion 274 which has communication with the passage 258 by means of a suitable passage 275.

When the separator is in the position shown in Fig. 39, the opening 246 will be disposed over the uppermost label 253 and in such a position that when the heater is lowered, the heated extremity 256 thereof will pass through the opening 246 and engage the uppermost label, acting upon the label to dry that portion of the label with which the heater contacts. At the same time, the valve mechanism 264 (see Fig. 18) will be opened to permit a suction to be created through the passage 258 in the heater and this suction will operate upon the portion of the label adjacent the extremity of the passage 258 and the opening 274 in the end of the heater thereby drawing that portion of the label into the opening to raise a blister 276, as shown more clearly in Figs. 40 and 41 and into which blister the extremity of the horn 243 projects when the separator 228 is rotated. The upper surface of the horn 243 is tapered downwardly below the plane of the upper surface of the body of the separator.

The separator having passed under the blistered portion of the label, and comes to a stop, the valve mechanism 249 will be opened to permit a blast of air to be directed through the passages 247 in the separator to further assist in separating the forward edges of the two uppermost labels. Obviously the valve mechanism 264 is timed to so operate that when the extremity 256 of the heater has been elevated above the plane of the top of the separator 228, the suction through the passage 258 of the heater will be cut off and the blistered portion of the label will disengage the extremity 257 of the heater.

In the form of the invention shown in Figs. 34 and 35, there is provided in the extremity 256 of the heater, a pin 277, the point of which preferably projects into the arched portion 274 so as to pierce the uppermost label to contact with the next label to hold the latter down. Obviously this pin may be dispensed with if desired, but when used the point thereof is so disposed with respect to the lower face of the extremity 256, that it will not penetrate the labels below the uppermost label.

If desired a smoothing element 278 may be provided for smoothing the label around the article after it has been applied thereto. From the above description it is thought that the operation of this machine will be clearly understood, but briefly stated it is as follows:

Assuming the parts to be in the position shown in Fig. 4 and with the label drum in the position shown in dotted lines, with reference to the label box, and the holding devices 102 and 111 which are in the uppermost position of the carrier, an article will be fed down the incline 43 to deposit an article upon the support 142 (see Fig. 15). At the same time the valve mechanism of the suction opening 189 will be opened and the edge of the uppermost label will be drawn by means of the suction, up to the drum. The operation of the mechanism will cause the arms 68 to be rocked and this will move the drum toward the other end of the label box. As the gears 171, 172 move over the racks 173, 174, they will be rotated and as the catch 215 (see Fig. 21) is in a position to engage in the notch in the disk 213, the drum will be rotated about its axis as indicated in Figs. 37 and 38, and will continue to rotate until the drum assumes the position shown in Fig. 38. Just as it is reaching this position, the gears 171, 172 ride upon the upwardly inclined portion 206 of the tracks or racks to elevate the drum, so that the edge of the label will contact with the article which has been moved in a position to receive the label, and to which article the paste has been applied by the paste applying element 155. The holding devices 111, 102 adjacent the drum will be rotated by the gear mechanism 116, 117 and 118 and the suction will be cut off from the drum so that by the rotation of the holding devices 11, the friction wheel 207 thereon will engage the friction wheel 208 that is connected with the drum and rotate the latter until the pin 216 contacting with the periphery of the friction element 207 will shift the catch 215 and unlock the drum, so that the drum will be rotated about its axis. During the time that the label is being removed from the label box by the drum, there will be a slight tension upon the label, lengthwise thereof to stretch the same, due to the slight difference in ratio between the diameter of the gears 171, 172 and the diameter of the drum. A further slight stretching of the label will be effected as the label is wound upon the article, due to the slight difference in ratio between the diameters of the friction wheels 207, and 208 and the article and the drum.

As the drum is rotated, about its axis, and when in the position shown in Figs. 5 and 38, the free end of the label will pass over the raised portion 209 of the drum so that during the rotary movement of the drum this free end of the label will contact with the paste roll 210 to have paste applied thereto, so that when it overlaps the edge of the label already secured to the article, it will be pasted down thereupon. When the drum reaches the position shown in dotted lines in Fig. 38, the catch 217 operates to lock the drum against further and independent rotation with respect to the shaft 170 and the arms 68 will be moved in the opposite direction to move the drum forwardly toward the front of the label box. Just before the drum reaches the position to pick up a new label, the trip device 220 engages the catch 217 to shift the latter and release the drum, so that the drum will rotate by gravity to its initial starting position and into a position where the catch 215 will again become operative with respect to the disk 213 so that the parts will be positioned to pick up a new label. While the drum has been moving to raise a label, the carrier 48 is being rotated to position a new article to receive the advancing label, and at the same time one of the labeled articles is moving into a position to be discharged from the carrier, the trip devices being arranged to release the holding devices so that the article can be discharged from the machine.

During the movement of the drum in picking up one label, the heater 255 is also moving into a position that its end will pass through the opening in the separator to engage a label and raise a blister thereon, so that the horn of the separator when the heater is elevated out of the way, will enter the blister and separate the edge of the top label from the next label, the blast of air being discharged through the passages 247 in the separator to assist in separating the edges of the label.

The suction created in the drum will pick up this separated end of the label and the suction will continue effective until the end of the label held thereby is in a position to contact with the article, at which time, the suction will be cut off and a blast will be directed through the drum to blow the end of the label against the article.

The article holders on the carrier are given a continuous rotation at all points except the receiving and discharging points, and the carrier itself is given an intermittent movement by means of the rod 90 and pawl and ratchet mechanism 87, 88.

The holders for the article on the carrier 48 which are respectively approaching the point at which an article is discharged and one is received into the machine, are arrested in their rotary motion with respect to the carrier by rendering the clutch mechanism 114, 115 inoperative and is accomplished by shifting the stem 112 to move the clutch member 114, away from the member 115 by means of the shoe 129, and the holding elements 102, 111 are separated to permit an article to be fed and one to be discharged by means of the sleeve 106 which is rotated by the pin 133 (see Fig. 10) engaging the handle 107, rotating the latter and drawing the element 102 away from the element 111. Previous to this separation of the holding elements, the supports 142, 140 (see Figs. 15 and 16) will be moved into such a position so that one of them will receive the incoming article and the other will receive the article to be discharged. The supports 142, 140 are then rocked to discharge the labeled article and to permit the incoming article to be grasped by the holding devices, and advanced without interfering with the operation of the mechanism.

Obviously brackets and supports may be provided wherever necessary and in many instances have been omitted from the drawings for the sake of clearness.

It will also be further manifest that the parts are so timed that they will operate at the proper intervals with respect to each other, so that portions of the mechanism will be allowed to position themselves so that they will not obstruct or interfere with the operation of the other mechanisms.

It is to be understood that while the preferred form of mechanisms and operation of the same have been herein shown and described, many changes may be made in the details of construction and in the arrangement of the parts without departing from the spirit of this invention.

If desired and in order to prevent the article carrier 48 from being overthrown by momentum, when it is actuated, any suitable stop device may be provided for the purpose, not necessary to illustrate.

For the purpose of uniformity throughout the specification and claims, the separator has been described and referred to as being adapted for use for separating labels, but it is to be understood that the separator is well adapted for separating other thin sheets of material, such for instance as papers or the like, and therefore the specification and claims are not to be limited to the handling and separating of labels alone.

What is claimed as new is:

1. A labeling machine embodying means for holding a supply of tempered labels, means adapted to form a blister of a portion of the tempered part of the outermost label and embodying a heater, and a rotatable disk-like element adapted to enter said blister and pass between the outermost label and the next adjacent label to separate the former from the latter.

2. A labeling machine embodying means for holding a supply of tempered labels, means adapted to form a blister of a portion of the outermost label and embodying a heater, and means adapted to enter the said blister and pass between the outermost label and the next adjacent label to separate the former from the latter.

3. A labeling machine embodying means for holding a supply of tempered labels, a disk like separator having a laterally deflected hornlike portion adapted to pass between the outermost label and the next adjacent label to separate the former from the latter, and means embodying a heater adapted to contact the outermost label and form a blister of a portion of such label to receive said horn like portion, and means for actuating said disk separator.

4. A labeling machine embodying means for holding a supply of tempered labels, a disk like separator having a laterally deflected hornlike portion adapted to pass between the outermost label and the next adjacent label to separate the former from the latter, and means embodying a heater adapted to contact the outermost label and form a blister of a portion of such label to receive said horn like portion, means for actuating said disk separator, and means for actuating the heater to move the same into and out of operative positions.

5. A labeling machine embodying means for holding a supply of tempered labels, a disk like separator having a laterally deflected horn like portion adapted to pass between the outermost label and the next adjacent label to separate the former from the latter, and means embodying a heater adapted to contact the outermost label and form a blister of a portion of such label to receive said horn like portion, means for actuating said disk separator, and provisions whereby the heater may pass through a portion of the disk separator to contact with the label.

6. A labeling machine embodying means for holding a supply of tempered labels, a separator element adapted to pass between the outermost label and the next adjacent label to separate the former from the latter, means for drying a portion of the label, and pneumatic means coöperating with the drying means and adapted to initially separate a portion of the adjacent labels to permit the entrance of the said separator element therebetween.

7. A labeling machine embodying means for holding a supply of tempered labels, a separator element adapted to pass between the outermost label and the next adjacent label, and means for initially separating a portion of the labels to permit the entrance of the first recited separator therebetween, the second recited means embodying a heater adapted to contact with a portion of the label to dry the same, and pneumatic means coöperating with said heater to deflect a portion of the label to form an initial entrance opening between the labels for the separator element.

8. A labeling machine embodying means for holding a supply of tempered labels, a separator element adapted to pass between the outermost label and the next adjacent label, and means for initially separating a portion of the labels to permit the entrance portion of the first recited separator therebetween, the last said means embodying a heater adapted to contact with a portion of the label to dry the same, pneumatic means coöperating with said heater to deflect a portion of the label to form an initial entrance opening between the labels for the separator element, and provisions for controlling the said pneumatic means.

9. A labeling machine embodying means for holding a supply of tempered labels, a separator element adapted to pass between the outermost label and the next adjacent label, and means for initially separating a portion of the labels to permit the entrance of the first recited separator therebetween, the second recited means embodying a heater adapted to contact with a portion of the label to dry the same, pneumatic means coöperating with said heater to deflect a portion of the label to form an initial entrance opening between the labels for the separator element, and provisions for automatically controlling the said pneumatic means.

10. A labeling machine embodying means for holding a supply of labels, a disk like separator adapted to pass between the outermost label and the next adjacent label, said separator having a laterally deflected horn like portion for directing the separator therebetween, pneumatic means for deflecting a portion of the label adjacent the separator to form an entrance opening for the horn like portion between the labels, said disk having an open recess to receive the deflected portion of the label, and means for controlling the said pneumatic means.

11. A labeling machine embodying means for holding a supply of tempered labels, a disk like separator adapted to pass between the outermost label and the next adjacent label, said separator having a laterally deflected horn like portion for directing the separator therebetween, a heater adapted to contact the outermost label adjacent the separator, pneumatic means coöperating with the heater for deflecting a portion of the label, means for shifting the heater, and means for controlling the said pneumatic means, the said disk having an open recess adapted to temporarily receive the said deflected portion of the label.

12. A labeling machine embodying means for holding a supply of tempered labels, a disk like separator adapted to pass between the outermost label and the next adjacent label, said separator having a laterally deflected horn like portion for directing the separator therebetween, a heater adapted to contact with the outermost label adjacent the separator, pneumatic means coöperating with the heater for deflecting a portion of the label, means for shifting the heater, and means for controlling the said pneumatic means, the said disk having an open recess adapted to temporarily receive the said deflected portion of the label, the said disk being provided with an opening therethrough through which the heater operates upon the label.

13. A labeling machine embodying means for holding a supply of tempered labels, a separator adapted to pass between the outermost label and the next adjacent label, means embodying provisions for drying a portion of the tempered part of the outermost label to form an initial entrance opening for the separator between the labels, and provisions for directing a blast of air between the partially separated labels.

14. A labeling machine embodying means for holding a supply of tempered labels, a separator adapted to pass between the outermost label and the next adjacent label, means embodying a heater for deflecting a portion of the outermost label to form an initial entrance opening for the separator between the labels, and provisions for directing a blast of air between the partially separated labels.

15. A labeling machine embodying means for holding a supply of tempered labels, a separator adapted to pass between the outermost label and the next adjacent label, means for deflecting a portion of the outermost label to form an initial entrance opening for the separator between the labels, said means embodying a heater adapted to contact with the outermost label and suction means coöperating with the heater and acting upon the label, and provisions for directing a blast of air between the partially separated labels.

16. A labeling machine embodying means for holding a supply of tempered labels, a separator adapted to pass between the outermost label and the next adjacent label, means for deflecting a portion of the outermost label to form an initial entrance opening for the separator between the labels, said means embodying a heater adapted to contact with the outermost label and suction means coöperating with the heater and acting upon the label, and provisions for directing a blast of air between the partially separated labels, and through the separator.

17. A labeling machine embodying means for holding a supply of tempered labels, a separator adapted to pass between the outermost label and the next adjacent label, means for drying a portion of the edge of the outermost label, means for separating said dried portion from the next label to form an entrance opening for the said separator therebetween, said separator having an air passage therethrough, and means for directing a blast of air through said passage and between the partially separated labels.

18. A labeling machine embodying means for holding a supply of tempered labels, a separator adapted to pass between the outermost label and the next adjacent label, means for drying a portion of the edge of the outermost label, means for separating said dried portion from the next label to form an entrance opening for the said separator therebetween, said separator having an air passage therethrough, means for directing a blast of air through said passage and between the partially separated labels, and means for controlling the said air blast.

19. A labeling machine embodying means for holding a supply of tempered labels, a separator adapted to pass between the outermost label and the next adjacent label, means for separating a portion of the edge of the outermost label from the next label to form an entrance opening for the said separator therebetween, said separator having an air passage therethrough, means for directing a blast of air through said passage and between the partially separated labels, and means for controlling the said air blast, said separator rotating in a plane substantially parallel with the plane of the body of the label and normally projecting over the edge of the supply of labels.

20. A label separator embodying a substantially flat body, a portion of the peripheral edge of the body being shaped to form a horn like portion, one of the surfaces of the horn like portion at the end of the horn, being beveled toward the opposite face of said portion, the edge of the body adjacent said portion being shaped to form a radially spaced overhanging shield.

21. A label separator embodying a substantially flat body, a portion of the peripheral edge of the body being shaped to form a horn like portion, one of the surfaces of the horn like portion at the end of the horn being beveled toward the opposite face of said portion, the edge of the body adjacent said portion being shaped to form a radially spaced overhanging shield, said body being provided with an air passage therethrough.

22. A label separator embodying a substantially flat body, a portion of the peripheral edge of the body being shaped to form a horn like portion, one of the surfaces of the horn like portion at the end of the horn being beveled toward the opposite face of said portion, the edge of the body adjacent said portion being shaped to form a radially spaced overhanging shield, said body being provided with an air passage therein opening through the peripheral edge thereof.

23. A label separator embodying a substantially flat body, a portion of the peripheral edge of the body being shaped to form a horn like portion, one of the surfaces of the horn like portion at the end of the horn, being beveled toward the opposite face of said portion, the edge of the body adjacent said portion being shaped to form a radially spaced overhanging shield, the said body being provided with a recess opening through its face, said recess being disposed adjacent the point of the said horn but spaced in advance thereof.

24. A label heater embodying a body having an extremity shaped to form a label engaging face, said body having a suction passage through said face, and a radial recess opening through said face, said recess having communication with the said suction passage.

25. A label heater embodying a body having an extremity shaped to form a label engaging face, said body having a suction passage opening through said face, a radial recess opening through said face, said recess having communication with the said suction passage, and a label impalement device located in said face.

26. A labeling machine embodying means for holding a supply of tempered labels, and means for separating the outermost label from the next adjacent label, the last recited means embodying provisions for drying a portion of the tempered part of the label to produce a blister.

27. A labeling machine embodying means for holding a supply of tempered labels, and means for separating the outermost label from the next adjacent label, the last recited means embodying provisions for drying a portion of the tempered part of the label to produce a blister, the last recited means also embodying pneumatic means for moving the said dried portion of the label.

28. A labeling machine embodying means for holding a supply of tempered labels, and means for separating the outermost label from the next adjacent label, the last recited means embodying provisions for drying a portion of the tempered part of the label to produce a blister, the last recited means also embodying pneumatic means for moving the said dried portion of the label in a direction transverse to the plane of the body of the label.

In testimony whereof we have signed our names to this specification, in the presence of two subscribing witnesses, on this 3rd day of November, A. D. 1916.

A. S. COLVER.
HENRY E. BELLM.

Witnesses:
IRMA M. BARING,
J. H. JOCHUM, Jr.